(12) United States Patent
Elias et al.

(10) Patent No.: US 10,356,129 B2
(45) Date of Patent: *Jul. 16, 2019

(54) SIMPLE TRUSTED TRANSFER TO INTERNET OF THINGS DEVICE

(71) Applicant: Synopsys, Inc., Mountain View, CA (US)

(72) Inventors: Andrew Elias, Ottawa (CA); Derek Bouius, Ottawa (CA); Neil Leckett, Ottawa (CA); Steven Lougheed, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/878,828

(22) Filed: Jan. 24, 2018

(65) Prior Publication Data

US 2018/0167416 A1 Jun. 14, 2018

Related U.S. Application Data

(63) Continuation of application No. 14/753,688, filed on Jun. 29, 2015, now Pat. No. 9,882,934.

(51) Int. Cl.
*H04L 9/32* (2006.01)
*H04L 29/06* (2006.01)

(52) U.S. Cl.
CPC .................. *H04L 63/20* (2013.01)

(58) Field of Classification Search
None
See application file for complete search history.

(56) References Cited

U.S. PATENT DOCUMENTS

| | | | | |
|---|---|---|---|---|
| 8,214,653 B1* | 7/2012 | Marr | ....................... | G06F 21/572 713/189 |
| 2011/0161672 A1* | 6/2011 | Martinez | .................. | G06F 21/57 713/176 |
| 2014/0052976 A1* | 2/2014 | Marino | .................... | G06F 21/56 713/2 |
| 2014/0059013 A1* | 2/2014 | Chao | ....................... | G06F 21/552 707/690 |
| 2015/0149732 A1* | 5/2015 | Kiperberg | ........... | G06F 12/1408 711/139 |

* cited by examiner

*Primary Examiner* — Brandon S Hoffman
(74) *Attorney, Agent, or Firm* — Jaquez Land Greenhaus LLP; Bruce W. Greenhaus, Esq.

(57) ABSTRACT

A system and method for updating multiple devices that are coupled to a network by a hub provides a trusted platform module in each of the devices, sends messages from the network to the hub for updating the devices, sends each of the devices messages from the hub to update the device, executes the content of each message in the device to which that message is sent, and deletes each message after it has been executed. Each of the messages preferably includes trusted code, and the device receiving each message executes the trusted code in the trusted platform module. The trusted code may include an update function, an image, and control data, and preferably has integrity. The hub may receive trusted code from a remote server, execute the trusted code to send a message to one of the devices, and then delete the trusted code.

19 Claims, 2 Drawing Sheets

SIMPLE TRUSTED TRANSFER TO INTERNET OF THINGS DEVICE

CROSS-REFERENCE TO RELATED APPLICATIONS—CLAIM OF PRIORITY

This application is a continuation application of application Ser. No. 14/753,688 filed Jun. 29, 2015, entitled "Simple Trusted Transfer to Internet of Things Devices", now U.S. Pat. No. 9,882,934, issued on Jan. 30, 2018, the disclosure of which is incorporated herein by reference in its entirety.

FIELD OF THE INVENTION

The present disclosure relates to Internet of Things, reduced size trusted processing devices.

SUMMARY

In accordance with one embodiment, an Internet of Things system comprises a hub coupled to a hub for receiving messages from the network, and to one or more devices for sending messages to each of the devices. In some embodiments, the devices execute the content of each received message prior to discarding the message. The message preferably comprises logic and an image to be executed by the device. The message is protected, and the system prevents reverse engineering and change functions and/or data when using encryption and integrity as the trusted code protection. The system preferably prevents changing functions and/or data when using integrity as the trusted code protection, and strengthens the security of the devices.

In accordance with another embodiment, a method of updating multiple devices that are coupled to a network by a hub comprises providing a trusted platform module in each of the devices, sending messages from the network to the hub for updating the devices, sending each of the devices messages from the hub to update the device, executing the content of each message in the device to which that message is sent, and deleting each message after it has been executed. Each of the messages preferably includes trusted code, and the device receiving each message executes the trusted code in the trusted platform module. The trusted code may include an update function, an image, and control data, and preferably has integrity. The hub may receive trusted code from a remote server, execute the trusted code to send a message to one of the devices, and then delete the trusted code.

Each of the devices includes less memory, less processing capacity, and consumes less power than the hub. Each of the messages can preferably be read by only one of the devices. Each device includes both volatile and non-volatile memory, stores each received message in the volatile memory, and stores only the image in the non-volatile memory. At least the update function in each of the messages is preferably encrypted.

The method may include sending a request to the hub from one of the devices before that device sends data to the hub, and then sending a reply message from the hub to the requesting device, the reply message containing an encryption algorithm to be executed by the device to encrypt data to be sent to the hub. The method may include establishing a secure binding between the hub and each of the devices, and maintaining a binding key in the hub for each of the devices.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1:
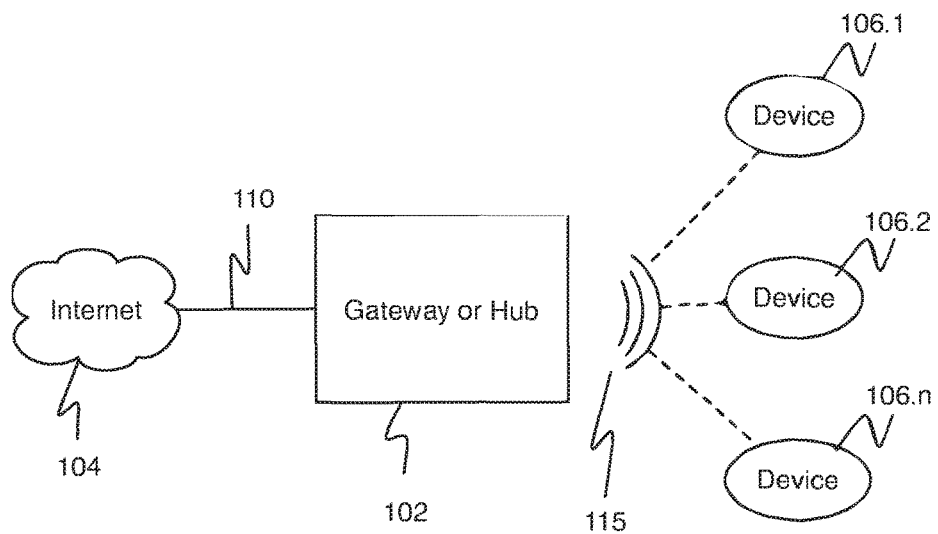
FIG. 1 is an example of an Internet of Things network architecture.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

BACKGROUND

A security perimeter refers to a physical aspect of the system that prevents attackers from accessing confidential information or manipulating data to break intended functionality. A security perimeter can be designed in the hardware, software or using a combination of both. The strength of a security perimeter is measured by its ability to prevent the many known attack scenarios. A proper implementation of a security perimeter should be built upon a trusted framework. Some examples of a trusted framework include secure boot, trusted processor module, etc.

Trusted code is software that can only be executed on a trusted processor module or trusted platform module (TPM). The trusted code protection format generally has encryption and/or integrity built in.

Existing techniques rely on implementing a localized security perimeter on the device. The strength of this security perimeter is dependent on the available resources on the device, which translates to higher cost.

DETAILED DESCRIPTION

The Internet of Things (IoT) is the network of physical objects or "things" embedded with electronics, software, sensors and connectivity to enable it to achieve greater value and service by exchanging data with a manufacturer, operator and/or other connected devices. Each thing is uniquely identifiable through its embedded computing system, but is able to interoperate within the existing Internet infrastructure. Referring to FIG. 1, an IoT architecture generally consists of a gateway or hub 102 in communications with one or more devices 106.1, 106.2 . . . 106.*n*. The hub communicates with the Internet 104 via a wired or wireless connection 110. The hub generally connects with the device via wireless connectivity 115, but there can also be wired connectivity. The hub is generally a computing system that has a relatively richer feature set compared to the device(s). This includes larger memory, more processing power and a strong security perimeter. The devices are generally cost sensitive modules with a limited set of resources. These limited resources include restricted memory, smaller processor, limited power and a weaker security perimeter compared to the hub. Some examples of devices include a controllable light bulb, a video camera, a sensor, etc.

There is a need to offer a trusted framework on the device and/or hub without increasing the cost or the complexity.

As part of the trust framework, the hub and the device can communicate to each other using trusted code.

The trusted code is protected. The protection can be in the form of encryption and/or integrity.

Figure 2:
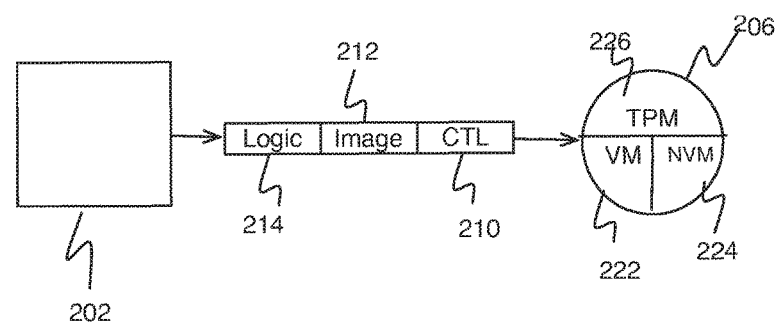
FIG. 2 is an example embodiment of a hub configuring dynamically one or more devices.

In one embodiment, the hub performs a device software/firmware update using trusted software. The device 206 comprises a TPM 226 to execute the trusted code, volatile memory (VM) 222 and non-volatile memory (NVM) 224. The device receives the trusted code (with encryption and integrity) from the hub, executes the trusted code to perform the software/firmware update and then deletes the trusted code. As shown in FIG. 2, the hub 202 generates a message (trusted code) for a selected device 206. The message comprises some control data 210, a software/firmware image 212 and update function 214. The message is protected using a scheme defined by the TPM and that only the selected device 206 can read. When the device 206 receives the message, it stores it in a volatile memory 222. It executes the update function 214 and copies the image to the non-volatile memory 224, possibly overwriting existing images already in the memory. The device then deletes the message.

The update function 214 is completely secure and unobservable. The data is also secure. The update function 214 can support a different update algorithm for every hub to device software/firmware update transaction.

If the device is compromised (outside the update window), it is not possible to determine how the update is made as there is nothing to reverse engineer. Even if the trusted code is observed on the device, the information and update function are encrypted and therefore cannot be read or understood.

Using this embodiment, the weaker security perimeter on the device is enhanced since the functions do not reside permanently on the device. In this example, the interaction between the hub and the device(s) together offer a stronger security perimeter for the system. Without this interaction, a stronger security perimeter implementation on each device is not possible due to cost and resource constraints. A similar reasoning may also apply to the hub.

As another embodiment, if the device wants to send secured data to the hub, the device first sends a request to the hub. The hub replies with a message wherein the image contains the encryption algorithm to execute and the key if applicable. The device executes the image to encrypt the data and sends the encrypted data to the hub. The device deletes the message and the image.

In this example, although the trusted code can be observed in transit, it cannot be read. Therefore the type of encryption used to send the data back to the device is unknown to the attacker observing the secure data from the device to the hub.

With this embodiment, a secure binding can be established between the hub and devices using, for example, each devices serial numbers. The hub maintains a binding key for each device. If the device is stolen no other hubs can bind with it.

If the hub security is compromised, then its software/firmware can be updated. The hub, in turn updates each device with new binding keys.

An attacker can observe back and forth messaging using trusted code but can't read the data hence cannot know what the functions and data are.

Another advantage of the embodiment is that if a device is stolen, there is no software or data to break into since it is deleted as soon as it is executed. Similarly, the software cannot be reverse engineered.

In another embodiment, the hub receives trusted software/firmware from a cloud base server (internet). Once received, the hub can securely run the software/firmware and delete it once it has completed execution.

The novelty of this technique is to transmit trusted code from one or many devices to another. Once received by the other devices, the trusted code is dynamically loaded into memory, executed using a TPM and deleted from the receiving device once the execution is complete. No persistent storage of the trusted code on the receiving device is required. It is possible to observe the trusted code while in transit or on the device. It is not possible view the plain text content or observe the run-time execution of the trusted code since it is protected by the TPM.

The trusted code can contain functions and/or information. Some examples include software updates, secure information, etc.

If the receiving device is compromised it is not possible to reverse engineer the functions or information inside the trusted code if the trusted code can be read from memory. If the device is compromised after the device deletes the trusted code, then there is nothing to reverse engineer on the device. The interaction increased the overall strength of the security perimeter for the device.

The trusted code may only have integrity. In this case, the functions and/or data in the trusted code can be observed but can not be changed. Executing non-confidential function(s) and/or sending non-confidential data from the hub to the device is an example. In this case, it is more important that the integrity of the function(s) and/or the integrity of the data is maintained.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of updating device software/firmware using trusted software sent by a hub within a network comprising the device and the hub, the method comprising:
    protecting within the hub, a message to be sent to the device having a trusted platform module (TPM), using a scheme defined by the TPM that only the selected device can read;
    sending from the hub, the message to the device to be updated, the message being encrypted and having integrity, the message having control data, a software/firmware image and an update function and being protected using a scheme defined by the TPM that only the selected device can read;
    executing the software/firmware image; and
    deleting the software/firmware image after executing.

2. The method of claim 1, wherein the message further comprises logic, the logic and software/firmware image to be executed by the device.

3. The method of claim 1, wherein reverse engineering and changes to functions and/or data are prevented when using encryption and integrity as the trusted code protection.

4. The method of claim 1, wherein changing functions and/or data is prevented when using integrity as the trusted code protection.

5. The method of claim 1, wherein the message from the hub further includes an encryption key.

6. The method of claim 1, further including establishing a secure binding between the network hub and the network device.

7. The method of claim 6, wherein the secure binding is created using a serial number associated with the network device.

8. The method of claim 6, wherein the network hub maintains a binding key for the device to be updated.

9. The method of claim 8, wherein the network hub can receive secure data from a plurality of network devices, the network hub maintaining a binding key for each network device.

10. A method for sending secure data from a network device to a network hub, the method comprising:
    receiving a request from the device in the network hub;
    sending a reply message from the hub in response to the received request, the message having an image containing an encryption algorithm that is executed by the device to encrypt data to be sent to the hub, and then deleting the image after execution;
    receiving in the hub, encrypted data from the device.

11. The method of claim 10, wherein the reply message from the hub further includes an encryption key.

12. A method for sending secure data from a network device to a network hub, the method comprising:
    sending a request from the network device;
    receiving a reply message from the hub containing an encryption algorithm to be executed by the network device;
    executing at least a portion of the encryption algorithm received from the hub to encrypt data to be sent to the hub;
    sending the encrypted data to the hub; and
    discarding at least the executed portion of the encryption algorithm.

13. The method of claim 12, wherein the reply message from the hub further includes an encryption key.

14. The method of claim 12, further including establishing a secure binding between the network hub and the network device.

15. The method of claim 14, wherein the secure binding is created using a serial number associated with the network device.

16. The method of claim 14, wherein the network hub maintains a binding key for the device to be updated.

17. The method of claim 16, wherein the network hub can receive secure data from a plurality of network devices, the network hub maintaining a binding key for each network device.

18. A network device comprising:
    a receiver for receiving a message including trusted code, the trusted code including encrypted control data, an encrypted software/firmware image and an update function;
    volatile memory for storing the trusted code;
    non-volatile memory; and
    a trusted platform module (TPM) configured to execute the update function within the received trusted code to decrypt the encrypted control data and the encrypted software/firmware, discard the executed portion of the trusted code after execution and copy the software/firmware image to non-volatile memory upon decryption.

19. The network device of claim 18, wherein the network device has a relatively weak security perimeter with respect to a network hub from which the message including the trusted code is sent.

* * * * *